United States Patent [19]

Darby

[11] Patent Number: 4,596,584

[45] Date of Patent: Jun. 24, 1986

[54] SOLID FUEL AND METHOD OF MANUFACTURE THEREOF

[76] Inventor: William F. Darby, 12 Napier Road, Maidenhead, Berkshire, England

[21] Appl. No.: 648,162

[22] PCT Filed: Aug. 30, 1984

[86] PCT No.: PCT/GB83/00346

§ 371 Date: Aug. 21, 1984

§ 102(e) Date: Aug. 21, 1984

[87] PCT Pub. No.: WO84/02717

PCT Pub. Date: Jul. 19, 1984

[30] Foreign Application Priority Data

Dec. 30, 1982 [GB] United Kingdom ............... 8236859
Dec. 2, 1983 [GB] United Kingdom ............... 8332239

[51] Int. Cl.$^4$ .................. C10L 5/00; C10L 5/14
[52] U.S. Cl. ..................... 44/1 D; 44/10 R; 44/24; 201/21; 201/23
[58] Field of Search ............ 44/1 R, 1 D, 1 E, 15 R, 44/4, 10 R, 11 F, 23, 24; 201/21, 23, 25

[56] References Cited

U.S. PATENT DOCUMENTS

| | | | |
|---|---|---|---|
| 1,497,866 | 6/1924 | Marchosky | 44/24 |
| 2,656,309 | 10/1933 | Brown | 201/23 |
| 3,506,414 | 4/1970 | Skendrovic | 44/1 R |
| 3,642,458 | 2/1972 | Hess et al. | 44/24 |
| 3,744,980 | 7/1973 | Harris | 44/1 R |
| 3,933,443 | 1/1976 | Lohrmann | 201/21 |
| 4,008,053 | 2/1977 | Brenneman et al. | 44/1 D |
| 4,026,678 | 5/1977 | Livingston | 44/1 D |
| 4,042,343 | 8/1977 | Bernard | 44/24 |
| 4,152,119 | 5/1979 | Schulz | 44/16 R |
| 4,164,396 | 8/1979 | Jones | 44/1 D |
| 4,272,322 | 6/1981 | Kobayashi | 44/1 D |
| 4,308,032 | 12/1981 | Benson | 44/1 E |
| 4,356,000 | 10/1982 | Chappell | 44/1 D |
| 4,395,265 | 7/1983 | Reilly et al. | 49/1 D |
| 4,405,331 | 9/1983 | Blaustein | 44/1 D |
| 4,445,906 | 5/1984 | Riemann et al. | 44/1 D |
| 4,496,365 | 1/1985 | Lindemann | 44/1 D |

FOREIGN PATENT DOCUMENTS

| | | | |
|---|---|---|---|
| 2046299 | 11/1980 | United Kingdom | 44/1 D |
| 2076013 | 11/1981 | United Kingdom | 44/1 D |
| 2104097 | 3/1983 | United Kingdom | 44/22 |

*Primary Examiner*—Andrew H. Metz
*Assistant Examiner*—Anthony McFarlane
*Attorney, Agent, or Firm*—David S. Woronoff

[57] ABSTRACT

A solid fuel consists of a mixture of one or more paper products and one or more oil products. Preferred mixtures one waste paper with fuel oil, waste oil, petroleum coke or refinery bottoms. A binding agent and/or an amount of water may be added to the above constituents. A method of making said solid fuel is also submitted.

16 Claims, 1 Drawing Figure

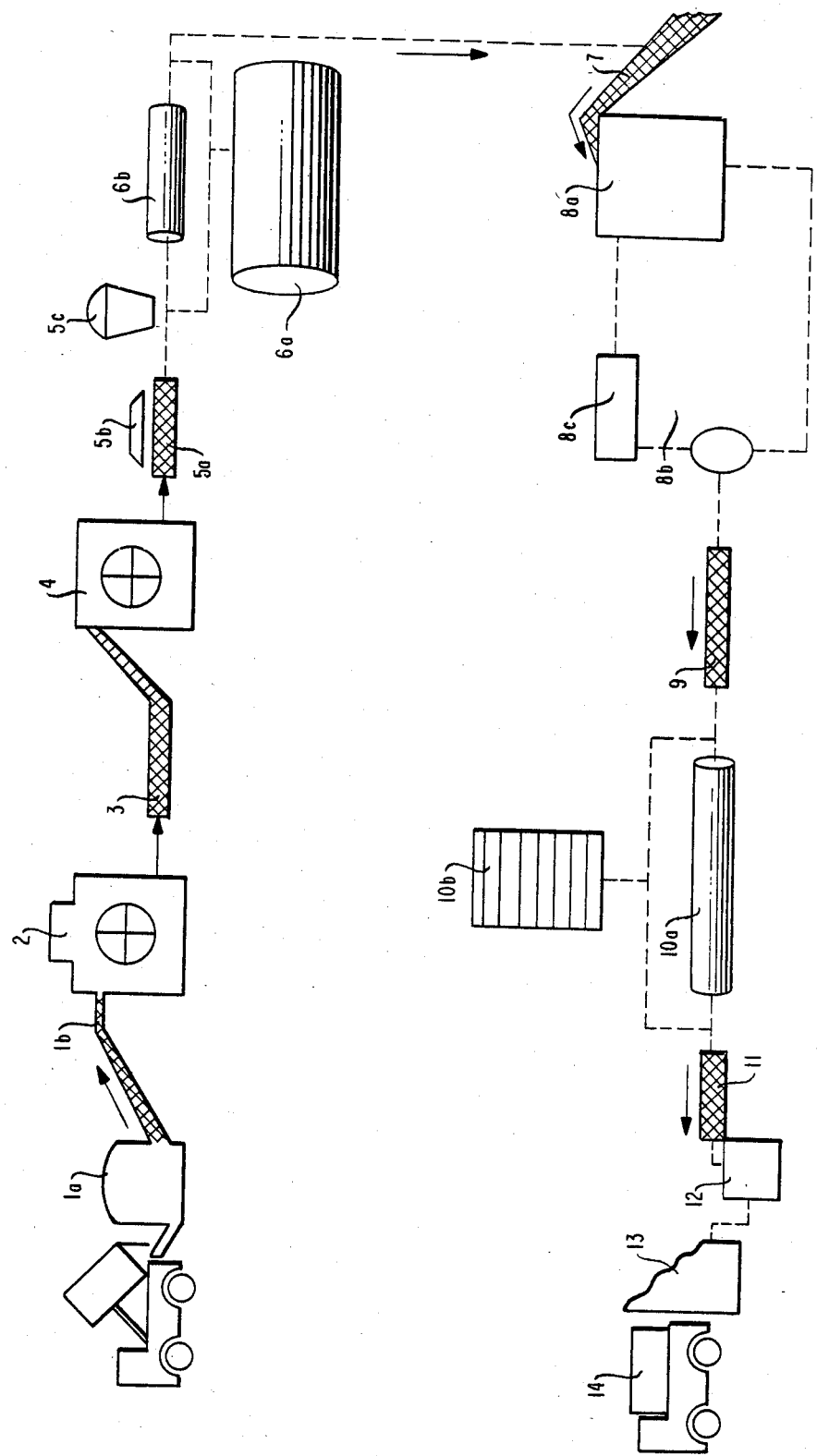

SOLID FUEL AND METHOD OF MANUFACTURE THEREOF

TECHNICAL FIELD

The present invention relates to a solid fuel and in particular to an alternative solid fuel which can be manufactured solely or predominantly from waste products.

Local authorities in the United Kingdom alone deal with over 20 million tonnes per annum of refuse, and approximately 80% of this refuse goes to 'landfill'. It is estimated that approximately 35% of domestic (and probably a higher proportion of commercial) refuse consists of paper and cardboard waste. One object of this invention is the recycling of waste paper/carton on a large scale, so reducing the amount of refuse going to landfill, i.e. reducing the volume of landfill sites, which present an environmental problem to the authorities for many years after (methane gas/explosion risk and a health hazard for children), and leading to the preservation of fossil fuels.

BACKGROUND ART

There are already known various solid fuels which are referred to as Refuse Derived Fuel (RDF) or Waste Derived Fuel (WDF). Fuels of this type are disclosed in U.K. Patent documents GB 1551020, GB 1597443, GB-A-2046299, GB-A-2076013. However, the fuels described in the above specifications suffer from one or more of the following disadvantages:

For example, the known processes for RDF/WDF fuels entail the deployment of costly and complex plant, i.e. 'ballistic separation plant', 'air classifiers' to separate the light fractions from the non-combustibles (metal, glass) from the general crude refuse. Above all RDF/WDF fuels require substantial dryers with a high energy consumption, because of the inherent high moisture content of general refuse, i.e. often more than 40%, and increasing sharply during spring and summer, as householders for instance dispose of grass cuttings from lawns.

RDF/WDF fuels as described in the above-mentioned documents have a medium calorific value (between approx. 4300 to 7000 BTU/lb (10 000 to 16 300 KJ/kg)). The RDF/WDF fuels also have a high pollution factor due to the presence of plastics and toxic substances contained in general refuse. The RDF/WDF fuels are unsuitable for bulk storage—they readily absorb environmental moisture, and can then be subject to 'bio-degration', i.e. 'compost heap-effect' and possible explosion risk if stored in bulk. Such RDF/WDF fuels have only a limited value to the industrial user because of their relatively low calorific value compared to coal, and they are not suitable for burning on open fires in a domestic situation.

Furthermore, RDF/WDF fuels as described in the above-mentioned documents present a possible health risk to operating/maintenance staff, i.e. unpleasant odours, toxic fumes, which can result in skin irritations and more serious side effects to health. The RDF/WDF fuels contribute to boiler corrosion because of the acid elements contained in refuse/waste derived fuels. The adoption of RDF/WDF fuel production as described in the above-mentioned documents is unlikely to be suitable for small local authorities or small companies, because of the high capital investment and high running costs to maintain such an operation. The energy consumption for dryers, separation plant, air classifiers in such an operation for the RDF/WDF is considerable.

Where composting is used, this is relatively costly in terms of energy used and supplies fuel with a relatively low calorific value, e.g. 500 btu maximum. Also where composted fuel is not compact, it is suitable for industrial application only, where the low calorific value is a disadvantage.

DISCLOSURE OF THE INVENTION

The present invention seeks to overcome or reduce one or more of the above disadvantages.

According to a first aspect of the present invention there is provided a solid fuel comprising pellets of a compressed mixture substantially comprising one or more paper products and one or more oil products, the oil product or one of the oil products being petroleum coke.

In a preferred fuel the oil products constitute 5% to 95% by weight of the mixture preferably 7% to 55%, and the paper products preferably constitute at least 40% and preferably 50% to substantially 100% by weight of the remainder of the mixture.

The term "paper product" includes paper, especially waste paper, cardboard and carton. The term "oil product" includes fuel oil, waste oil, coke in slurry or solid form, refinery bottoms (including sludge, residue and bitumen), and vegetable oil.

The term "pellet" includes bodies of all shapes including cylinders, cubes and briquettes.

According to a second aspect of the present invention there is provided a method of producing a pelletised solid fuel comprising the steps of feeding pieces of one or more paper products and one or more oil products to a pelletising means, the oil product or one of the oil products being petroleum coke, the paper product(s) and the oil product(s) being in the form of a mixture in the pelletising means, and pelletising the mixture.

The paper product(s) and the oil product(s) are preferably fed separately to the pelletising means, and are mixed there.

Advantages offered by the above fuels are as follows:

1. Higher calorific value than previous RDF/WDF fuels (from BTU/lb 7900 to 10500 (18 375 to 24 420 KJ/kg))

2. Higher consistency of calorific value (due to less variation in ingredients).

3. No health hazard to operating/maintenance staff. In particular, no composting is required.

4. Less capital investment for plant—cheaper to operate both in terms of energy consumed and manning levels.

5. Increased 'die life' on pelleting press—the oil products contained in the present fuel as the primary or secondary largest constituent to up-grade the calorific value, will further act as a lubricant and consequently less energy is used in addition to the extended die life.

6. Lower moisture content (approx. 5–15%—after pelletising and cooling).

7. Lower ash content (approx. 4–8%). Less down time of boilers because of shorter, less frequent spells of de-ashing.

8. Lower sulphur content (between 1.25 and 1.5%, the figure of 1.25 being the more likely content). consequently less pollution, i.e. less acid rain particularly in the Scandinavian countries.

9. More suitable for bulk storage. The oil products in the solid fuel bodies will act as a 'moisture repellant' and when stored under cover in bulk there is very little danger of any bio-degration. Provided that the solid fuel bodies are stored in a dry environment, there is no problem in long-term bulk storage, if desired. Because of the substantial amounts of oil products contained in the present solid fuel acting as a "moisture-repellant" and in addition preventing bio-degradation, such a paper/oil fuel is suitable for storage in open yards as used for coal, where covered storage is unavailable.

10. No danger of 'spontaneous combustion'.
11. Less damage to boilers caused by corrosion.
12. Less forming of clinker/slag. No problem with 'static ash waste', i.e. less chimney monitoring and maintenance required.
13. Reduction in or avoidance of damage to fluidised-bed furnaces.

It has been found that with RDF/WDF fuels there is a problem with glass and plastics particles, damaging fluidised-bed boilers.

14. The oil product serves to bind the pellets, thus a separate binding agent is not always necessary.
15. The present paper/oil product is clean to handle.

BRIEF DESCRIPTION OF THE DRAWING

A preferred embodiment of the present invention will now be described, by way of example only, with reference to the accompanying drawing which shows schematically the steps of a method for the production of solid fuel.

MODES FOR CARRYING OUT THE INVENTION

The waste paper/carbon is deposited in a feed hopper 1a and transported via a conveyor 1b to a primary shredder in the form of a hammer mill 2. The material then passes via conveyor 3 to a second shredder 4. The material then passes via conveyor 5a to a metal extraction unit with an overband magnet, permanent magnet or any other type of suitable magnet device 5b, and is transported to a dryer 6a or 6b. (The extracted metals are collected in a metal bailer or simply disposed off in a suitable container arrangement 5c).

The shredder paper (preferably having an approximate width of between 10 mm and 20 mm) is conveyed to pass through a 'moisture extraction unit' of either the drum/cascade type 6a, fitted with a moisture/temperature sensor, or a 'flash dryer' 6b, the latter operating much faster i.e. only 4 to 6 seconds drying time in some applications. Such a drying arrangement (6a to 6b) would only have to come into operation with the use of shredded paper with a moisture content in excess of 15%. It has been found during tests that shredded paper should ideally have an approximate moisture content of 15% (in the present method this moisture content will consist of mostly oil), prior to pelletising. The shredded paper is then elevated at 7 to a surge hopper 8a and into a pelleting press 8b. Such a pelleting press should be suitable for the extrusion of low density materials. The admixtures e.g. fuel oil/waste oil/petroleum coke/refinery bottoms, possibly with a binder (e.g. a resin) and-/or water are added through a conditioning mixer unit 8c, preferably with automatic dosage control.

The following mixtures for pelletising are specifically envisaged:

(A) Waste paper + petroleum coke.
(B) Waste paper + petroleum coke + fuel coil, or waste paper + petroleum coke + waste oil, or waste paper + petroleum coke + fuel oil + waste oil.

It may be desirable to add sufficient water via such a conditioning mixer unit to bring the moisture content of the shredded paper to approx. 15% and approximately 1 to 2% of an organic or inorganic binding agent. The addition of water has been found to create an interesting emulsification reaction with the paper and oil products and a 'shiny' end product is the result. Any binder (approx. between 1 to 2%) added will enhance the coherency and strength of the solid fuel pellets produced. However, it was generally found that solid fuels produced by the above method have sufficient strength in their own right and the addition of any binding agent is usually not necessary.

The shredded paper and oil product mixture is extruded by forcing it through a die with rollers reaching temperatures of between 100° C. and 135° C. at the die stage. It is extruded in the form of cylindrical pellets, square cubes or 'miniature briquettes' (see Table 1 for typical dimensions). The pellets can be cut to the required length by adjustable knives. The extruded bodies are then transferred by a conveyor 9 to a cooler. The type of cooler used may be the horizontal type 10a or the vertical type 10b.

It has been found that if the mixtures have a moisture content of between 5 and 15% (preferably 15%) prior to extusion in the pelletising press, no drying is required after pelletising/cooling, since the temperature reached during pelletising (100° to 135° C.), coupled with the 'air flow' during cooling, is generally sufficient to cure such a solid fuel.

After cooling 10a or 10b the end product is then conveyed at 11 to a bagging arrangement 12 and moved to storage 13 and/or a lorry 14. Alternatively it may be transported for immediate use, e.g. to a boiler-feed hopper ready for burning.

Examples of possible compositions of paper and oil products and relevant technical data, produced according to the above described method can be found in Table 1. The composition of the solid fuel may be flexible in dependence on the user's access to oils, waste oils, oil wastes, refinery bottoms. The use of binding agents is optional.

Such a paper/oil based alternative solid fuel is suitable for burning in solid fuel boilers as used for coal, for both domestic and industrial application. The cylindrical pellets (Table 1) are more suitable for industrial boilers and domestic boiler use. The larger fuel bodies i.e. 'square cubes' or 'miniature briquettes' are designed for suitable open fireplaces or "chimney-ovens", the latter describing domestic fire place installations with hinged doors. Any domestic solid fuel appliance should incorporate underfloor air, or fan-assisted, or secondary combustion features, for the present paper/oil alternative solid fuels to be burnt efficiently.

For the industrial user, modern solid fuel boilers, the fluidised-bed type in particular, or forced draught boilers lend themselves particularly well for the use of paper/oil pellets as described above and in Table 1. Traveling grates, fixed grates and multi-hearth furnaces can be used.

It would be of an advantage to the industrial user of such a paper/oil solid fuel to opt for a 'multi-fuel' capacity, i.e. in times of paper and/or coal shortage the boilers could be switched to oil or gas. Equally, the paper-/oil solid fuel of the present invention can be burned together with coal, if insufficient paper should be available at any time. However, from point of view of calorific value the paper/oil solid fuel as described above and in Table 1 is quite capable of replacing coal, since its calorific value is only slightly below that of coal (paper-/oil solid fuel between BTU/lb 7900 to 10500 (18 375 to 24 420 KJ/kg)—coal 11000 (25 580 KJ/kg)).

At the lower end of the calorific range, the solid fuel is especially suitable for burning in domestic wood-burning stoves.

In the above described mixtures the paper product may be supplemented by straw, bagasse, peat wood shavings and/or sawdust. Man-made or natural fibrous cloth, cotton husks and coal dust may also be included.

In accordance with the invention petroleum coke is used with or without the addition of fuel oils or waste oils for up-grading the calorific value of the present alternative solid fuel. Petroleum coke is very high in carbon content, lower in sulphur, has a lower water content, results in less ash residue, and due to its 'smooth' texture, does not have an adverse abrasive effect on the pelleting dies as is the case with coal dust, and in addition petroleum coke has a much better bonding quality than coal dust.

Where the paper emerging from the magnetic separator 5 is sufficiently dry, the dryer 6a or 6b can be omitted.

The use of dry paper products is the preferred option in the present invention, since the viability of the present solid fuel will be greatly increased without the need for dryers and the high energy consumption associated with the use of dryers.

The primary and secondary shredders may be constituted by hammer mills, flail mills, rotor shears or any other shredding machine. It is preferred that at least the primary shredder is a hammer mill, since this is especially robust to cope with the initial material.

Although the oil product has been disclosed as being introduced directly into the pelleting means, it can alternatively be added to the paper product before the latter reaches the pelletising means, but preferably after shredding has been completed.

TABLE 1
SPECIFICATION OF PAPER/OIL SOLID FUELS

| Composition/Type %/weight | Ai | Aii | Bi | Bii |
|---|---|---|---|---|
| Shredded Paper/Carton | 80 | 50 | 45–50 | 45 |
| Med. Fuel Oil 'F' Or Light Fuel Oil 'E' Heavy Fuel Oil 'G' Waste Oil (filtered) | | | 1–5 | 1–5 |
| PETROLEUM COKE Or Refinery bottoms Sludge/Residue/Bitumen | 20 | 50 | 45 | 45–50 |
| CALORIFIC VALUE | | | | |
| BTU/lb approx. | 8400 | 10500 | 10500 | 10500+ |
| KJ/kg approx. | 19540 | 24420 | 24420 | 24420+ |
| Moisture Content approx. | 5 to 15% | | | |
| Sulphur Content approx. | 1.25 to 1.5% | | | |
| Ash Residue approx. | 4 to 8% | | | |

SHAPES OF PAPER/OIL SOLID FUELS

| | |
|---|---|
| Cylindrical Pellet | From 15 mm dia to 50 mm length |
| | From 25 mm dia to 50 mm length |
| Square Cube | From 30 mm × 30 mm to 60 mm × 60 mm |
| Miniature Briquette | From 30 mm × 30 mm × 70 mm To 50 mm × 50 mm × 100 mm |

TABLE 1-continued
SPECIFICATION OF PAPER/OIL SOLID FUELS

| Composition/Type %/weight | Ai | Aii | Bi | Bii |
|---|---|---|---|---|
| Approx. Density Kg/m³ | Between 600 and 1250 | | | |

I claim:

1. A solid fuel comprising pellets of a compressed mixture comprising one or more paper products and one or more oil products, the oil product or one of the oil products being petroleum coke, the oil products constituting 5% to 95% by weight of the mixture and the paper products constituting at least 40% by weight of the remainder of the mixture.

2. A fuel according to claim 1 wherein the oil products constitute 7% to 55% by weight of the mixture.

3. A fuel according to claim 1 wherein the paper products constitute 50% to substantially 100% by weight of the remainder of the mixture.

4. A fuel according to claim 1 further comprising a binding agent whereby to enhance the coherency and strength of the fuel.

5. A fuel according to claim 1 wherein the paper product(s) is/are selected from paper and cardboard.

6. A fuel according to claim 1 wherein in addition to the petroleum coke, the oil products are selected from fuel oil, waste oil, and refinery bottoms.

7. A fuel according to claim 1 wherein the oil products include medium fuel oil, the medium fuel oil comprising up to 5% by weight of the mixture.

8. A fuel according to claim 1, wherein the petroleum coke comprises 90% to 100% by weight of the oil products.

9. A fuel according to claim 1 wherein the mixture also includes one or more of the following: straw, bagasse, peat, wood shavings, man-made or natural fibrous cloth, cotton husks and coal dust.

10. A method for making a pelletised solid fuel comprising the steps of feeding pieces of one or more paper products and one or more oil products to a pelletising means, the oil product or one of the oil products being petroleum coke, the paper product(s) and the oil product(s) being in the form of a mixture in the pelletising means, the oil products constituting 5% to 95% by weight of said mixture and the paper products constituting at least 40% by weight of the remainder of said mixture, and pelletising the mixture.

11. A method according to claim 10 wherein the paper product(s) and the oil product(s) are fed separately to the pelletising means (8b) and mixed there.

12. A method according to claim 10 wherein water is also supplied to the pelletising means (8b).

13. A method according to claim 10, wherein a binding agent is also supplied to the pelletising means (8b).

14. A method according to claim 10 wherein before being fed to the pelletising means (8b), the paper product(s) is/are passed through shredding means (2, 4).

15. A method according to claim 10, wherein the pelletising is achieved by an extrusion process.

16. A solid fuel comprising pellets of a compressed mixture comprising one or more paper products and one or more oil products, the oil product(s) comprising 5% to 95% by weight of the mixture and the paper product(s) comprising 50% to 100% by weight of the remainder of the mixture, the oil product(s) comprising 90% to 100% by weight of petroleum coke and the calorific value of the pellets being at least 7,900 BTU/lb (i.e. 18375 KJ/kg).

* * * * *